Dec. 23, 1958    G. NISCHK ET AL    2,865,788
BONDING PROCESS
Filed March 10, 1954
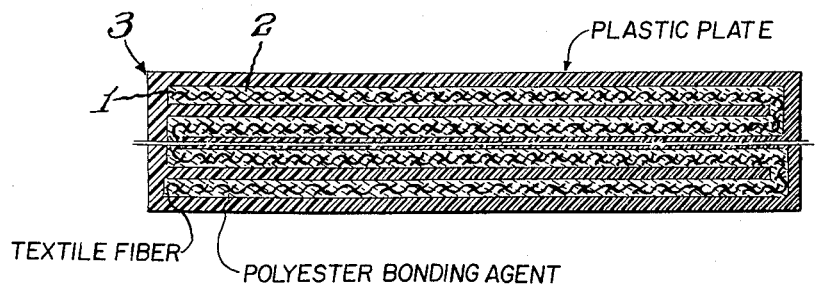
INVENTORS:
GÜNTHER NISCHK,
KARL E. MÜLLER,
& EUGEN BOCK
BY Connolly and Hutz
THEIR ATTORNEYS – # United States Patent Office 2,865,788
Patented Dec. 23, 1958

2,865,788

BONDING PROCESS

Günther Nischk, Leverkusen, Karl E. Müller, Leverkusen-Bayerwerk, and Eugen Bock, Leverkusen, Germany, assignors to Farbenfabriken Bayer Aktiengesellschaft, Leverkusen, Germany, a corporation of Germany Application March 10, 1954, Serial No. 415,414

Claims priority, application Germany March 13, 1953

5 Claims. (Cl. 117—72)

This invention relates to a process of bonding glass and plastic one to the other.

It is known that the mechanical properties of a number of plastics are substantially improved by the incorporation therein of fibrous materials. Glass fibres are especially suitable for this purpose, since they improve substantially the strength of plastics prepared for instance by polymerization of unsaturated polyesters with vinyl or polyallyl compounds or by polycondensation reactions. These polymers with glass fibres incorporated suffer from the considerable disadvantage that, in the course of time, the polymer is gradually decomposed at the surface of contact with the glass fibre and the plastic becomes brittle. This phenomenon occurs especially with material which has been exposed to atmospheric conditions for a prolonged time so that traces of moisture can reach the surface of contact of the glass fibre and the polymer, where local saponification takes place which is evidently caused by traces of alkali in the glass. These disadvantages can be avoided by making the glass fibre wettable by a solution of unsaturated polyester in vinyl compounds, so that the fibre is coated with a homogeneous film, and by providing an extraordinarily good adhesion between the glass fiber and the polymer.

It is known to increase the strength of the bond by pretreating the glass fibre with various products, of which polyacrylates and the chromium complexes of acrylic and methacrylic acid have proved to be particularly useful.

The present invention is based upon the surprising discovery that unsaturated copolymerizable condensation or polymerization products containing carboxyl groups ensure a far better adhesion between the glass fibre and the polymer than the above mentioned products which have previously been employed to pretreat glass fibres.

According to the invention plastic and glass are bonded one to the other by pretreating glass with an unsaturated polymeric product containing free carboxyl groups and producing the plastic in situ by reacting an unsaturated polyester with a monomeric unsaturated compound in the presence of a catalyst in contact with the pretreated glass.

The products employed according to the invention, which contain substantially the ester group as the chain linking member, can be obtained by conventional methods, for instance by condensation of a mixture of polyalcohols and polycarboxylic acids. In the condensation the reactants can be either employed in such a quantitative proportion as to give a polycondensation product containing free carboxyl groups, or a large excess of polyalcohol (calculated on the quantity employed) can be employed, which results in the formation of a condensation product with a very high content of hydroxyl groups. To these saturated or unsaturated condensation products containing hydroxyl groups, unsaturated or saturated dicarboxylic acid anhydrides are added in a second phase, whereupon ester interchange takes place with ring opening to leave one free carboxyl group. Suitable products include the water soluble condensation products obtainable for instance by condensing polyethylene alcohols with polycarboxylic acids and subsequent addition of dicarboxylic anhydride. Furthermore, the ester carboxylic acids obtained by partial saponification of polyvinyl acetate and subsequent reaction with maleic anhydride are useful for the process of the invention.

On treating the glass fibre with a solution of one of the aforedescribed products, the filament is coated after evaporation of the solvent with a homogeneous, stable film which is distinguished by a good adhesiveness. By placing the filament thus pretreated in solutions of unsaturated polymerizable polyesters and vinyl compounds and adding compounds accelerating the polymerization, polymers are obtained wherein the bonding strength between the glass fibre and the polymer is extraordinarily strong and which no longer show the disadvantages associated with the previously used products, even when exposed to atmospheric conditions or storage conditions in water for prolonged periods.

The drawing in this case illustrates a molded plastic plate reinforced with fiber glass, the latter being bonded to the plastic as described above.

The new process thus offers the possibility of using, instead of the previously used preparations, products which have an extraordinarily high affinity for glass, due to their content of free carboxyl groups, are stable under normal conditions of storage and, in combination with unsaturated polyesters and vinyl compounds, are capable of taking part in the copolymerization reaction in the presence of compounds accelerating polymerization, thus providing a strong bond both to the glass and the polymer.

Instead of the unsaturated polymerizable polyesters dissolved in vinyl compounds, unsaturated polymerizable polyesters carrying carboxyl groups, which can be prepared by the process of our copending application Ser. No. 278,508 filed April 25, 1952, by Günther Nischk, Karl E. Müller and Otto Bayer, now abandoned, can also be employed in the process of the invention. Especially good results are obtained by incorporating into these products glass fibres pretreated with unsaturated polyesters containing carboxyl groups in the manner described above.

The invention is further illustrated by the following examples in which the parts given are by weight:

*Example 1*

A 1% solution of a polyester dissolved in ethyl acetate is sprayed on to a well purified and degreased glass plate. The polyester is prepared as follows:

222 parts of phthalic anhydride and 380 parts of a hydroxyethylated trimethylol propane of hydroxyl number 800 are condensed at 210° C. in known manner, finally under vacuum, until an acid number of 2 and a hydroxyl number of 230 are reached. The condensation product is then reacted at 120° C. for one hour with maleic anhydride in a quantity corresponding to the hydroxyl number, so as to cause addition of the maleic anhydride, and is then taken up in ethyl acetate.

After volatilization of the solvent, which takes place rapidly, the sprayed glass plate is exposed to a temperature of 100° C. for one hour. Thereupon a 3 mm. thick layer of a mixture of an unsaturated polyester (prepared from one mol of maleic acid, one mole of phthalic acid and two mols of 1.3-butylene glycol) and styrene, which contains 2% of benzoyl peroxide as catalyst, is applied to the plate. The layer of this mixture is covered with another non-pretreated, purified glass plate and is polymerized at 90° C. for one hour. After completion of the polymerization, the non-pretreated glass plate can be taken off easily, whereas the glass plate pretreated with the unsaturated polyester containing carboxyl groups sticks to the polymerizable polyester resin layer so firmly that the glass surface is considerable torn on trying to separate the two surfaces by force.

*Example 2*

Glass monofils, after issuing from the nozzles of a multifilament spinning machine, are collected into a cable and passed over a binder cushion which is fed with a 5% solution of a polyester containing carboxyl groups, which is prepared as follows:

66 parts of maleic anhydride are added at 120° C. to 100 parts of an unsaturated polyester prepared by ester interchange between one mol of maleic acid dimethyl ester and two mols of diethyleneglycol, and then taken up in methylene chloride.

After evaporating the solvent in an air current the glass filaments thus treated are reeled. A fabric made from these filaments is arranged in ten superposed layers, coated with a mixture of the unsaturated polyester and styrene (as indicated in Example 1) and compressed in a 100° C. hot press at a pressure of 2 kg./cm.$^2$ for 2 minutes. Due to the pretreatment the filaments are thoroughly wetted with the polyester resin and a plate is obtained which is free of bubbles and has very good strength properties.

The resulting plate is illustrated in the drawing wherein a plurality of layers of fiber glass textile 1 which are coated with the polyester bonding agent 2 are incorporated into a plastic plate 3.

*Example 3*

A very good adhesion of unsaturated polyesters to glass is also obtained by treating a glass plate with an unsaturated polyester containing carboxyl groups according to Example 1. The polyester is prepared by an addition reaction between 196 parts of maleic anhydride and 478 parts of an unsaturated polyester prepared by ester interchange from 288 parts of maleic acid dimethylester and 310 parts of diglycol at 120° C. for one hour and then taking up in ethyl acetate. The further treatment corresponds to that described in Example 1.

We claim:

1. The process of bonding plastic to glass which comprises applying an ethylenically unsaturated polymeric product containing carboxyl groups to a surface of the glass, thus forming a coating on said glass, applying to the surface of said coating (1) a polymerizable ethylenically unsaturated polyester (2) a liquid ethylenically unsaturated monomer which is polymerizable with said polyester and (3) a polymerization catalyst for the reactants of said mixture, then permitting polymerization to take place.

2. A process according to claim 1, wherein said ethylenically unsaturated polymeric product is obtained by reacting a polyester containing free OH groups with an anhydride of a dicarboxylic acid, at least one of said components being ethylenically unsaturated.

3. A process according to claim 2, wherein said polyester is a branched polyester which is obtained by thermal esterification of a polyhydric alcohol having at least three OH groups with a dicarboxylic acid.

4. A process according to claim 2, wherein the said anhydride of a dicarboxylic acid is maleic anhydride.

5. A process according to claim 3, wherein said polyester is reacted with maleic anhydride.

References Cited in the file of this patent

UNITED STATES PATENTS

| | | |
|---|---|---|
| 2,418,833 | Harris et al. | Apr. 15, 1947 |
| 2,542,819 | Kropa | Feb. 20, 1951 |
| 2,647,093 | Opp et al. | July 28, 1953 |
| 2,664,413 | Parker | Dec. 29, 1953 |
| 2,671,065 | Ulrich | Mar. 2, 1954 |
| 2,760,948 | Moffett et al. | Aug. 28, 1956 |
| 2,766,142 | Thomas | Oct. 9, 1956 |